(12) United States Patent
Roe et al.

(10) Patent No.: US 7,577,234 B2
(45) Date of Patent: Aug. 18, 2009

(54) PORTABLE CONTROL STATION FOR THE INSPECTION OF PEOPLE AND LUGGAGE

(75) Inventors: Kristofer Roe, Mount Arlington, NJ (US); Walter Knoespel, Geisenheim (DE); Erwin Kirsten, Ingelheim (DE); Fred Hemp, Bingen (DE); Stefan Aust, Idstein (DE)

(73) Assignee: Smiths Heimann GmbH, Wiesbaden (DE)

( * ) Notice: Subject to any disclaimer, the term of this patent is extended or adjusted under 35 U.S.C. 154(b) by 235 days.

(21) Appl. No.: 10/995,282

(22) Filed: Nov. 24, 2004

(65) Prior Publication Data

US 2009/0074138 A1 Mar. 19, 2009

(51) Int. Cl.
*G01N 23/04* (2006.01)

(52) U.S. Cl. .................. 378/57; 378/208

(58) Field of Classification Search .......... 378/57, 378/208
See application file for complete search history.

(56) References Cited

U.S. PATENT DOCUMENTS

| | | | | |
|---|---|---|---|---|
| 4,669,767 A * | 6/1987 | Leto | ................ | 292/259 R |
| 4,826,236 A * | 5/1989 | Bennett | ................ | 296/186.2 |
| 4,906,973 A * | 3/1990 | Karbowski et al. | ................ | 340/551 |
| 5,065,418 A * | 11/1991 | Bermbach et al. | ................ | 378/57 |
| 5,600,303 A * | 2/1997 | Husseiny et al. | ................ | 378/57 |
| 5,692,028 A | 11/1997 | Geus et al. | | |
| 5,699,400 A * | 12/1997 | Lee et al. | ................ | 378/57 |
| 5,833,294 A * | 11/1998 | Williams et al. | ................ | 296/24.32 |
| 6,507,278 B1 * | 1/2003 | Brunetti et al. | ................ | 340/541 |
| 6,672,760 B2 * | 1/2004 | Ishii et al. | ................ | 378/198 |
| 6,972,693 B2 * | 12/2005 | Brown et al. | ................ | 378/57 |
| 2003/0150228 A1 * | 8/2003 | Sanders | ................ | 62/243 |
| 2005/0047086 A1 | 3/2005 | Gedamu et al. | | |
| 2005/0074086 A1 * | 4/2005 | Pendergraft | ................ | 378/6 |
| 2005/0078004 A1 * | 4/2005 | Johnson | ................ | 340/539.26 |
| 2005/0206514 A1 * | 9/2005 | Zanovitch et al. | ................ | 340/506 |

FOREIGN PATENT DOCUMENTS

| | | |
|---|---|---|
| BE | 742 275 A | 5/1970 |
| DE | 40 23 415 A1 | 2/1991 |
| DE | 195 32 965 A1 | 3/1997 |
| FR | 2 587 680 | 3/1987 |
| GB | 2152448 A * | 8/1985 |
| WO | WO-81/03004 | 10/1981 |

* cited by examiner

*Primary Examiner*—Chih-Cheng G Kao
(74) *Attorney, Agent, or Firm*—Muncy, Geissler, Olds & Lowe, PLLC

(57) ABSTRACT

A portable control station for the inspection of people and luggage includes a portable, container-like room module, which on two opposite walls has at least one door each. Between the doors, a passage zone for people is formed inside the room module. In the area of the passage zone, a people inspection device is arranged, and alongside the passage zone an inspection device for luggage with a control area is located.

26 Claims, 3 Drawing Sheets

PORTABLE CONTROL STATION FOR THE INSPECTION OF PEOPLE AND LUGGAGE

This non-provisional application claims priority under 35 U.S.C. § 119(a) on German Patent Application No. 10 2004 043 158.2 filed in Germany on Sep. 3, 2004, which is herein incorporated by reference.

BACKGROUND OF THE INVENTION

1. Field of the Invention

The present invention relates to a portable control station for the inspection of people and luggage.

2. Description of the Background Art

For the inspection of people and luggage, before entering security-relevant zones, a multitude of methods and devices are known. As is commonly known, X-ray inspection devices for luggage and metal detectors for passenger control are permanent fixtures at airports to check the passengers and their luggage for security-relevant objects like weapons, explosives etc.

Likewise, mobile X-ray inspection devices are already known, with which objects to be inspected can be transilluminated with X-rays. DE 195 32 965 A, for example, describes a mobile, motored X-ray inspection device for large-volume goods that is designed as a special-purpose vehicle and can be driven to be employed at various locations. DE 40 23 415 is directed to a mobile inspection apparatus for luggage, whereby the elements of an X-ray inspection device, namely power supply for the radiation generators, the radiation generators, the radiation receivers and a control area are arranged in a portable container. A transport path leads through the container for the objects to be inspected, which are thus inspected while passing through the container.

Conventional mobile inspection devices, however, are less suited for the protection of time-limited meetings, like sports or cultural events, conventions etc., particularly, if they take place in public streets or places because they are not able to check participants and their hand luggage with sufficient speed and thoroughness. Permanently installed devices are too costly for these meetings and/or cannot be employed due to local conditions.

SUMMARY OF THE INVENTION

It is therefore an object of the present invention to provide a mobile inspection device for people and their hand luggage, whereby the mobile inspection device can be moved quickly and without much expenditure to various places of employment and is able to quickly inspect people and their luggage.

According to an embodiment of the present invention, this object is achieved with a mobile inspection unit that is constructed as a portable control station, which includes a portable, container-like room module that has on two opposite walls at least one door on each wall, between which a passage zone for people is formed inside the room module, and whereby, in the area of the passage zone, a people inspection device is arranged, and whereby an inspection device for luggage with a control area is arranged next to the passage zone.

Thus, the control station contains the inspection devices and pieces of equipment that are required for the inspection of people and luggage, which can vary depending on the place of employment and the security requirements. It can be easily transported as one unit, containing all the required inspection devices and pieces of equipment, and can be quickly employed requiring no special expenditure or tools. One advantage of the control station is that it can be used as a checkpoint between an uncontrolled spatial area and a controlled area, for example, at the entrance area of a closed sports facility. Likewise, it can be employed advantageously at the exit of production or research facilities to inspect personnel leaving the facility to avoid theft or the unauthorized removal of objects or materials, for example, nuclear materials from nuclear facilities.

The meaning of "container-like" for the room module is that its size, shape, weight and stability is such that it can be transported by air, sea, or land in conventional transport vehicles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus, are not limitive of the present invention, and wherein.

DETAILED DESCRIPTION

Figure 1:
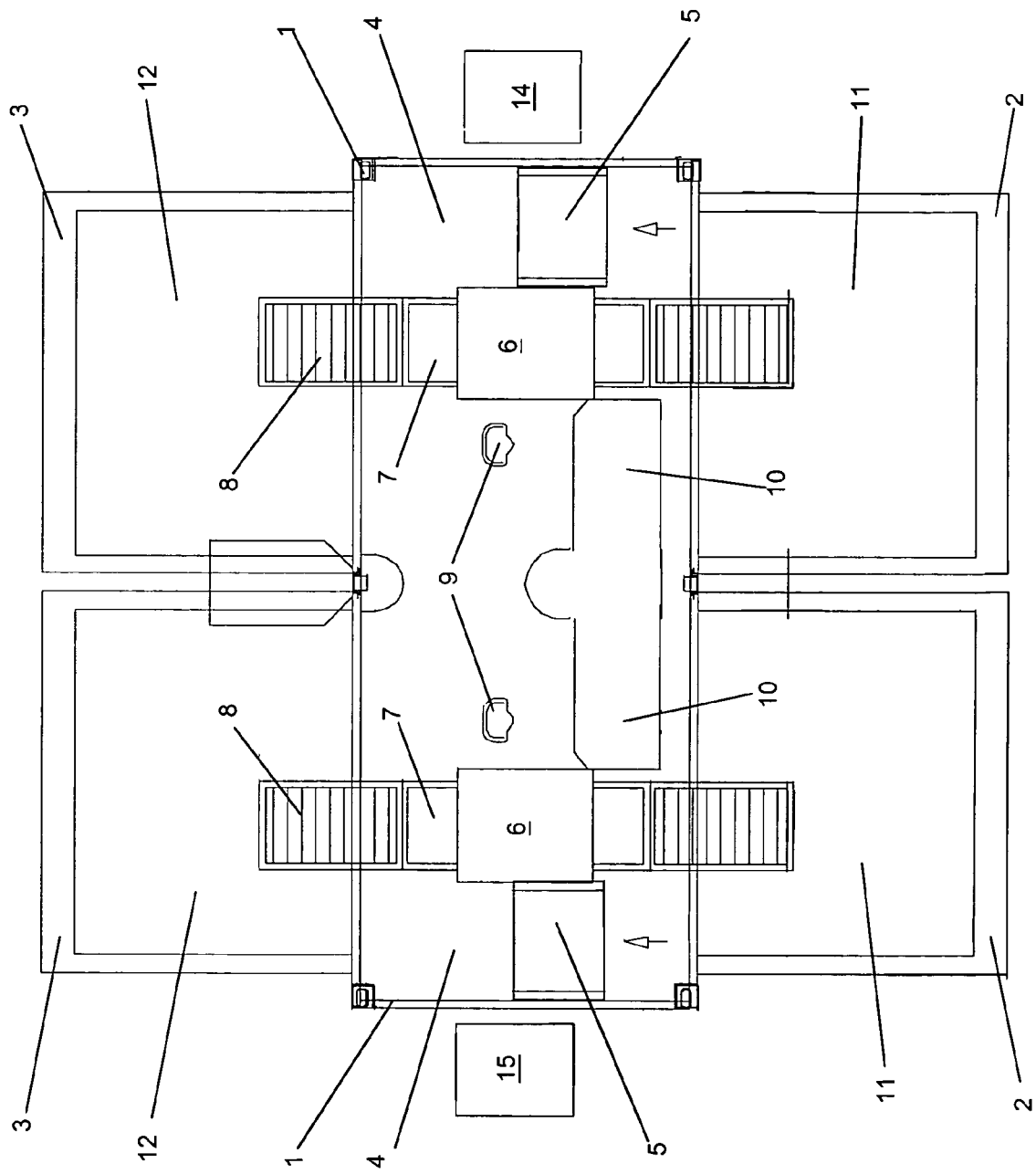
FIG. 1 shows a plan view of a control station in operation having its doors open, according to a preferred embodiment of the present invention.
Figure 2:
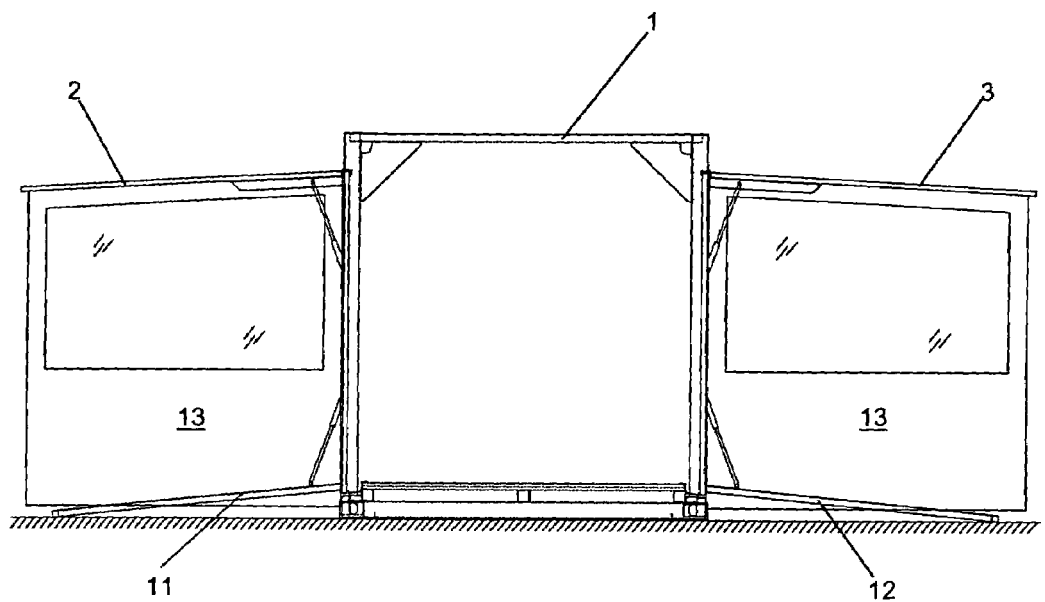
FIG. 2 shows a side view of the control station in operation.
Figure 3:
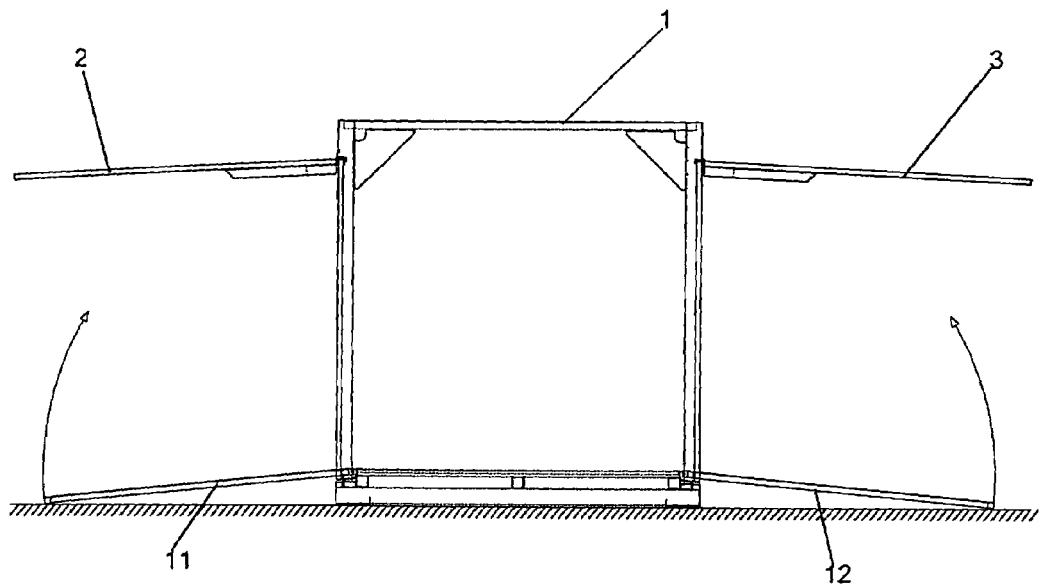
FIG. 3 shows schematically a door opening procedure.

The control station illustrated in FIGS. 1-3 serves to inspect persons and their hand luggage, who are visitors at an event, for example, a sports event. It was set up for this event as a check point in the entrance area of the athletic grounds so that all visitors have to go through the control station for inspection.

The control station includes a portable, container-like room module 1, which on two opposite walls has at least one door 2, 3 each. The doors 2, 3 are hinged on an upper edge of the respective wall, so that during transport, they can be pivoted downwards to close the room module 1. Between door 2 at an entrance side and door 3 at an exit side, a passage zone 4 for people is formed, in the area of which a people inspection device 5 is arranged.

During operation, doors 2, 3 are folded up in a horizontal position, as illustrated in FIGS. 2 and 3, so that they can be used as, for example, a canopy. The doors 2, 3, thus expand the weather-protected area of the control station. In this area, a control person can perform additional manual inspections of luggage as well as people if it is deemed necessary.

In a preferred embodiment, the people inspection device 5 is a door-shaped metal detector, which has to be passed through to check for metal objects, for example, weapons. Alternatively, or additionally, detection devices for explosives, drugs, radioactive materials or other materials hidden on the body, the presence of which is to be checked, can be arranged in the passage zone 4.

Next to the passage zone 4, a luggage inspection station 6 is arranged, which is used to screen people's carry-on bags for objects or materials of interest. In a preferred embodiment, a conventional X-ray inspection device is used, whereby the carry-on luggage is x-rayed, and thus examined for the presence of weapons, explosives etc. As an alternative, or in addition, other conventional inspection devices for luggage can be installed, for example, devices based on X-ray diffraction or nuclear quadrupol resonance. Depending on the targeted application of the control station, the luggage is thus inspected for relevant objects and/or materials, for example, weapons, explosives, drugs, chemical, biological or nuclear materials, with the person simultaneously passing through the room module 1.

The luggage inspection station 6 includes a conveyor belt 7 that transports the pieces of luggage through the inspection station 6. The transport path of the conveyor belt 7 is extended on both ends by a roller belt conveyor 8, which projects from the room module 1 and is folded down during operation. During transportation, the roller belt conveyor 8 is folded up, whereby it is then located inside the room module 1.

Inside the room module 1, next to the luggage inspection station 6, a control area 9 for the luggage inspection station 6 and associated electronics for data evaluation can be permanently installed. A screen (not further shown) for the inspection station 6 is positioned on a sideboard 10. The sideboard 10 also serves a dual purpose by blocking the control area 9 in order to keep people, e.g., non-personnel, from entering.

In the event that the control station also has the function to detect and/or identify people, the necessary personal identification systems can also be installed in the control area 9 and sideboard 10, or in another suitable location.

As illustrated in FIGS. 2 and 3, below each door 2, 3, on a lower edge of the sidewall of room module 1, hinged bottom flaps 11, 12, which can be pivoted upwards, is attached. In the state of operation, as illustrated in FIG. 1, each bottom flap 11, 12 is folded down, thus forming a stable floor below its corresponding folded-up door 2, 3. For use during the winter months, e.g., cold weather, it is possible to enclose the expanded inspection room below the folded-up doors 2, 3 by hanging a tarpaulin 13 on each side extending from the folded-up door 2, 3 to the folded-down bottom flap 11, 12. To heat the control room, a temperature control unit, i.e., a portable heater 14 is provided, which during operation can be positioned outside and next to the room module 1, and warmed air is channeled into the room module 1 through an existing opening for heating the room module 1. In an alternative embodiment, the temperature control unit can be an air-conditioning device that lowers the temperature of the room module 1. To make the control station energy-independent, a power generator 15 is carried along, which during operation can be positioned to the side next to room module 1 and supplies all devices with the required power.

In an alternative embodiment of the present invention, as illustrated in the figures, the elements required for the inspection of people and luggage are duplicated. Thus, there are two identical inspection paths, which makes it possible to double the inspection rate for people and luggage. The corresponding doors 2, 3 and bottom plates 11, 12 along the lateral side of the room module 1 are also duplicated. This setup allows one half of the room module 1 to be closed off so that only one inspection path is being used to adjust to lesser traffic and thus, lesser inspection personnel. For practical purposes, the elements of both inspection paths are arranged in a mirror-inverted manner so that the control areas 9 of the two luggage inspection devices 6 are next to each other on the inside.

For application in dangerous areas, the frame, the walls and the doors 2, 3 of the room module 1 are of suitably solid and protective construction to provide a secure room for the people and the inspection devices that are present in the room module 1. If necessary, bullet-proof glass or protective shields against other dangers can be mounted in targeted areas.

Figure 4:
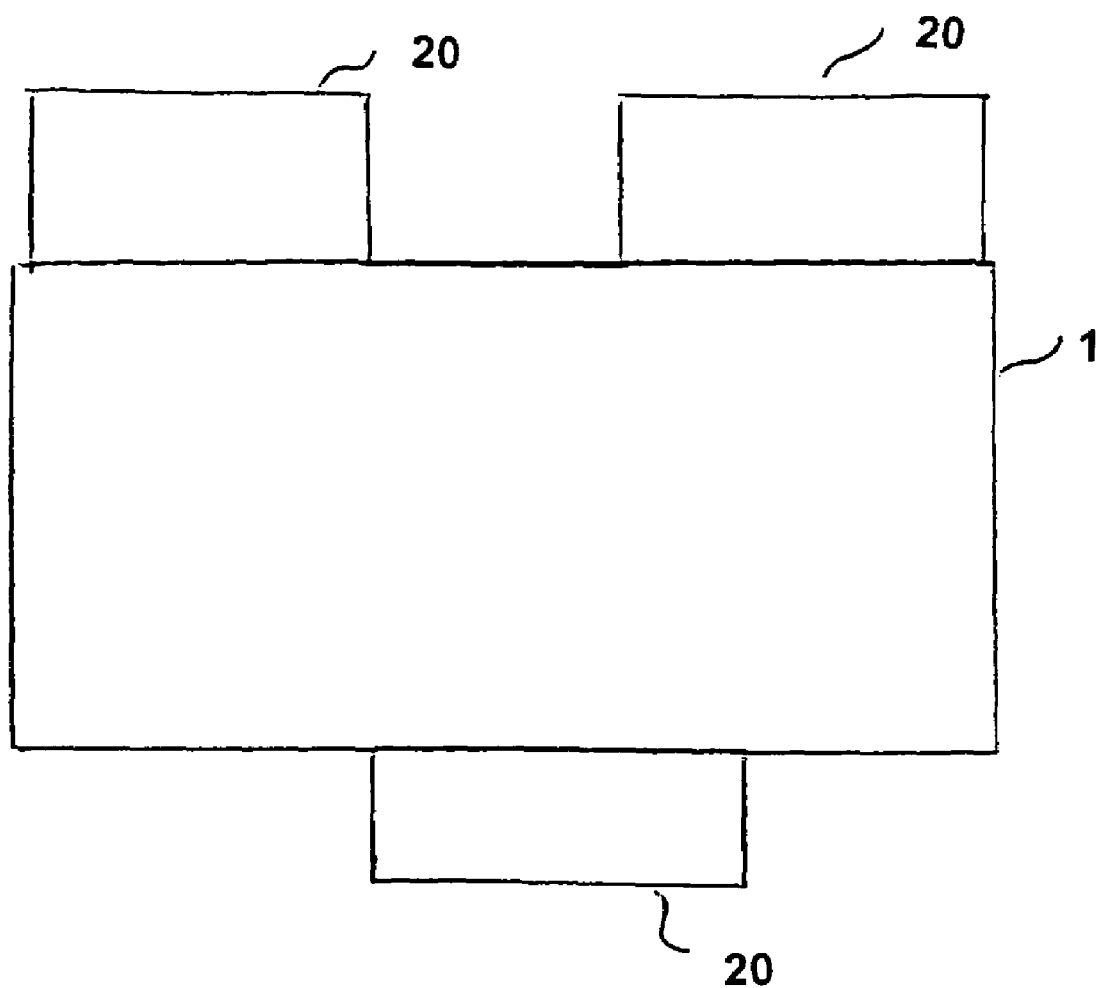
FIG. 4 illustrates a further embodiment of the present invention.

FIG. 4 illustrates a further embodiment of the present invention. The room module 1 can be provided with one or more slide out wall sections 20 in order to increase the working area within the room module 1 for personnel during the inspection of people and luggage. During transport of the room module 1, the slide out wall sections 20 are then retracted into the room module 1. The slide out wall sections 20 can also be extracted and retracted either manually or through a motor. In addition, the doors 2, 3 can be integrated into the slide out wall sections 20, or the slide out wall sections 20 can be positioned between the doors 2, 3 on a side of the room module 1, for example, or any other desirable configuration.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A portable container configured to inspect people and luggage, comprising:
   two opposite walls having at least one door each,
   a passage zone for people between the two opposite walls and within the container,
   a people inspection device, and
   an inspection device for luggage with a control area, the inspection device for luggage including a conveyor device configured to extend from a first position within the container to a second position external to the portable container,
   wherein in an area of the passage zone, the people inspection device is arranged, and alongside the passage zone the inspection device for luggage is arranged.

2. The portable container according to claim 1, wherein the doors fold upwards and into a horizontal position during operation of the portable container.

3. The portable container according to claim 1, wherein a person identification system is installed in the portable container.

4. The portable container according to claim 1, wherein a construction of a frame, the walls, and the doors of the portable container is such as to provide a secure room for the people and the inspection devices present therein.

5. The portable container according to claim 1, wherein the devices required for the inspection of people and luggage are provided in duplicate to form two identical inspection paths within the portable container.

6. A portable container comprising:
   a first set of oppositely facing walls and a second set of oppositely facing walls, the first set of oppositely facing walls being transverse to the second set of oppositely facing walls, and the first set of oppositely facing walls including at least one door folding upwards and into a horizontal position during operation of the portable container;
   an x-ray inspection device for inspecting articles being provided within the portable container, wherein the x-ray inspection device includes a conveyor for passing articles within the container, the conveyor extending partially beneath the doors folding upwards into the horizontal position;

a people inspection device for inspecting people being provided within the portable container; and a passage zone formed between the first set of oppositely facing walls, the passage zone having an entrance area and an exit area, wherein the people inspection device is at least partially positioned within the passage zone to inspect people traversing from the entrance area to the exit area.

7. The portable container according to claim 6, wherein the people inspection device is a metal detector.

8. The portable container according to claim 7, wherein the metal detector is formed so as to facilitate a person to walk therethrough.

9. The portable container according to claim 6, wherein the people inspection device is fixedly attached to a floor of the portable container.

10. The portable container according to claim 6, wherein the x-ray inspection device is fixedly attached to a floor of the portable container.

11. The portable container according to claim 6, wherein the portable container has at least one slide out wall section.

12. The portable container according to claim 6, wherein the portable container has securing devices on at least one corner edge of the portable container to secure the portable container during transport.

13. The portable container according to claim 6, wherein a control station for operating the people inspection device and the x-ray inspection device is provided in the portable container.

14. The portable container according to claim 6, wherein the x-ray inspection device has a conveyor belt to transport the articles through the x-ray inspection device.

15. The portable container according to claim 6, wherein a second people inspection device is provided within the portable container.

16. The portable container according to claim 6, wherein a second x-ray inspection device is provided within the portable container.

17. The portable container according to claim 6, wherein the first set of oppositely facing walls includes at least two doors folding upwards and into the horizontal position.

18. The portable container according to claim 17, wherein each wall of the first set of oppositely facing walls includes at least one door folding upwards into the horizontal position.

19. The portable container according to claim 17, wherein each wall of the first set of oppositely facing walls includes at least two doors folding upwards into the horizontal position.

20. A portable container comprising:

a first set of oppositely facing walls;

a second set of oppositely facing walls, wherein at least one wall of the second set of oppositely facing walls comprises at least two doors;

a pair of passage zones within the container and extending between the second set of oppositely facing walls;

at least one x-ray inspection device within the container for inspecting luggage, the at least one x-ray inspection device including a conveyor device configured to extend from a first position within the container to a second position external to the container; and at least one people inspection device for inspecting people within at least one of the passage zones.

21. The portable container according to claim 20, wherein each wall of the second set of oppositely facing walls comprises at least two doors.

22. The portable container according to claim 20, further comprising an entrance area and an exit area, wherein at least one of the doors is pivotable downwards to form a floor below the entrance area or the exit area.

23. The portable container according to claim 20, further comprising an entrance area and an exit area, wherein at least one of the doors is pivotable upwards to form a canopy above the entrance area or the exit area.

24. The portable container according to claim 20, further comprising an entrance area and an exit area, wherein at least one of the doors is pivotable downwards to form a floor below the entrance area or the exit area and at least one of the doors is pivotable upwards to form a canopy above the entrance area or the exit area.

25. The portable container according to claim 20, further comprising two x-ray inspection devices.

26. The portable container according to claim 25, further comprising two people inspection devices, wherein each of the people inspection devices is within one of the passage zones.

* * * * *

UNITED STATES PATENT AND TRADEMARK OFFICE
CERTIFICATE OF CORRECTION

PATENT NO. : 7,577,234 B2  
APPLICATION NO. : 10/995282  
DATED : August 18, 2009  
INVENTOR(S) : Roe et al.

Page 1 of 1

It is certified that error appears in the above-identified patent and that said Letters Patent is hereby corrected as shown below:

On the title page add item (30) Foreign Application Priority Data

Sept. 3, 2004   (DE) ................ 10 2004 043 158.2

Signed and Sealed this

Twenty-seventh Day of October, 2009

David J. Kappos  
*Director of the United States Patent and Trademark Office*